(12) United States Patent
Kaushal (10) Patent No.: US 11,917,111 B2
(45) Date of Patent: Feb. 27, 2024

(54) HIGHLIGHT INDICATOR-BASED SCREEN TRANSITIONS

(71) Applicant: Hewlett-Packard Development Company, L.P., Spring, TX (US)

(72) Inventor: Aparna Kaushal, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/680,811

(22) Filed: Feb. 25, 2022

(65) Prior Publication Data

US 2023/0061240 A1 Mar. 2, 2023

(30) Foreign Application Priority Data

Aug. 31, 2021 (IN) .............................. 202141039396

(51) Int. Cl.
*G06F 3/04847* (2022.01)
*H04N 1/00* (2006.01)

(52) U.S. Cl.
CPC ..... *H04N 1/00419* (2013.01); *H04N 1/00384* (2013.01); *H04N 1/00411* (2013.01); *H04N 1/00435* (2013.01); *G06F 3/04847* (2013.01)

(58) Field of Classification Search
CPC ........... H04N 1/00421; H04N 1/00427; H04N 1/00429; H04N 1/00432; H04N 1/00424; H04N 1/00419; H04N 1/00416; H04N 1/00413; H04N 1/00408; H04N 1/00384; H04N 1/00411; H04N 1/00435
See application file for complete search history.

(56) References Cited

U.S. PATENT DOCUMENTS

| | | | |
|---|---|---|---|
| 6,957,397 B1 * | 10/2005 | Hawkins | H04M 1/72403 715/810 |
| 7,676,763 B2 * | 3/2010 | Rummel | G06F 3/0482 715/845 |
| 8,245,156 B2 * | 8/2012 | Mouilleseaux | G06F 3/04883 715/834 |
| 8,351,989 B2 * | 1/2013 | Ahn | G06F 3/0489 715/767 |
| 8,601,389 B2 * | 12/2013 | Schulz | G06F 3/0482 715/810 |
| 8,959,457 B2 * | 2/2015 | Reed | G06F 3/0482 715/834 |
| 9,021,371 B2 * | 4/2015 | Mock | G06F 3/0482 715/810 |
| 10,114,523 B2 * | 10/2018 | Hwang | H04N 21/4854 |
| 2006/0143574 A1 * | 6/2006 | Ito | G06F 3/04817 715/810 |

(Continued)

*Primary Examiner* — Justin S Lee
(74) *Attorney, Agent, or Firm* — Brooks, Cameron & Huebsch, PLLC (57) ABSTRACT

An example image forming apparatus may include a display panel, a memory, and a processor connected to the memory and the display panel. The display panel may display a first screen including a highlight indicator and a menu having a menu option displayed in the highlight indicator. Further, the memory may include a screen transition module to receive a selection of the menu option. Further, the screen transition module may perform a screen transition from the first screen to a second screen that displays a submenu option in the highlight indicator. The submenu option is associated with the selected menu option.

18 Claims, 6 Drawing Sheets

(56) References Cited

U.S. PATENT DOCUMENTS

| | | | |
|---|---|---|---|
| 2007/0094617 A1* | 4/2007 | Nurmi | G06F 3/04842 345/157 |
| 2008/0201637 A1* | 8/2008 | Shirasaki | H04N 1/00514 715/705 |
| 2010/0064258 A1* | 3/2010 | Gorczowski | G06F 3/0482 715/841 |
| 2010/0070925 A1* | 3/2010 | Einaudi | G06F 3/0485 715/830 |
| 2010/0229125 A1* | 9/2010 | Cha | H04N 21/42204 715/863 |
| 2011/0145764 A1* | 6/2011 | Higuchi | G06F 3/0482 715/835 |
| 2012/0124521 A1* | 5/2012 | Guo | G06F 3/0482 715/834 |
| 2012/0173982 A1* | 7/2012 | Herz | G06F 3/04847 715/830 |
| 2012/0216117 A1* | 8/2012 | Arriola | H04N 21/4821 715/841 |
| 2013/0007663 A1* | 1/2013 | Piippo | G06F 3/0482 715/841 |
| 2015/0070362 A1* | 3/2015 | Hirai | G06T 13/80 345/475 |
| 2015/0234548 A1* | 8/2015 | Pierre | G06F 3/0482 715/768 |
| 2015/0378600 A1* | 12/2015 | Sloan | G06F 3/0482 715/773 |
| 2016/0378273 A1* | 12/2016 | Kaehler | G06F 3/0482 715/841 |
| 2021/0200393 A1* | 7/2021 | Wohlstadter | G06F 3/04886 |

\* cited by examiner

HIGHLIGHT INDICATOR-BASED SCREEN TRANSITIONS

BACKGROUND

Electronic devices, such as mobile phones, smart watches, control panels of image forming apparatuses, and the like, may include a display panel to display a graphical user interface (GUI). The GUI may be operable to display various pieces of information such as menu options to set and/or manage functions of the electronic devices. The GUI may enable users to access various functions via navigating through the menu or a list of menu options. For example, the menu options may be organized hierarchically, where one menu selection may lead to another menu, which may lead to yet another menu. However, as the number of functions of the electronic devices increases, the number of menu options stored in the menu may also increase.

BRIEF DESCRIPTION OF THE DRAWINGS

Examples are described in the following detailed description and in reference to the drawings, in which.

DETAILED DESCRIPTION

Electronic devices may include a display panel to display a graphical user interface (GUI). The GUI may be operable to display a menu with various menu options to set and/or manage functions of the electronic devices. An example electronic device may include an image forming apparatus, a smart watch, a smartphone, or the like. The GUI may enable users to access the functions via navigating through the menu or a list of menu options. For example, a smartwatch may include a GUI with menu options to control various features of the smartwatch. In another example, a control panel of an image forming apparatus may include a GUI to display menu options to control various functions or settings associated with printing, faxing, copying, scanning, and/or the like. However, as the number of functions of the electronic devices increases, the number of menu options stored in the menu may also increase which makes the menu complicated and laborious to navigate.

Further, GUIs with significantly smaller screens, for instance, may not accommodate headers or breadcrumbs to establish where the user is in a flow while navigating through the menu. Furthermore, the GUIs with smaller screens may use screen transitions where the screens move like a card, for instance. In this example, the GUI may remove the prior card and display a new card. When the new card is pushed on the screen, the user may experience like a new interaction or scenario is being presented. Similarly, while navigating back, the user may lose the context of the previous interaction. Thus, during the screen transitions, the users may lose the context of parent-child interactions while navigating through the menu options.

Examples described herein may provide an electronic device including a display panel and a processor connected to the display panel. The display panel may display a first screen. The first screen may include a highlight indicator (e.g., a pill shaped) and a menu having a menu option displayed in the highlight indicator. The processor may receive a user-selection of the menu option. Further, the processor may perform a screen transition from the first screen to a second screen via a slidable replacement of the menu option in the highlight indicator with the submenu option. In an example, the highlight indicator may contextually connect the submenu option of the second screen to the menu option of the first screen during the screen transition.

The screen transitions described herein may connect the content/interaction of a next screen with a current screen through a morph animation in the highlight indicator without completely removing the menu options from the current screen. The screen transitions may be designed for an entry, exit, and/or return of a screen type. Thus, the screen transitions may provide continuity of flows and content in significantly smaller GUIs to minimize a cognitive load while navigating through various menus, menu environments, task flows, or the like. Further, the screen transitions may use pill-morph and layering techniques to simulate the continuity of the flows and content.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Figure 1:
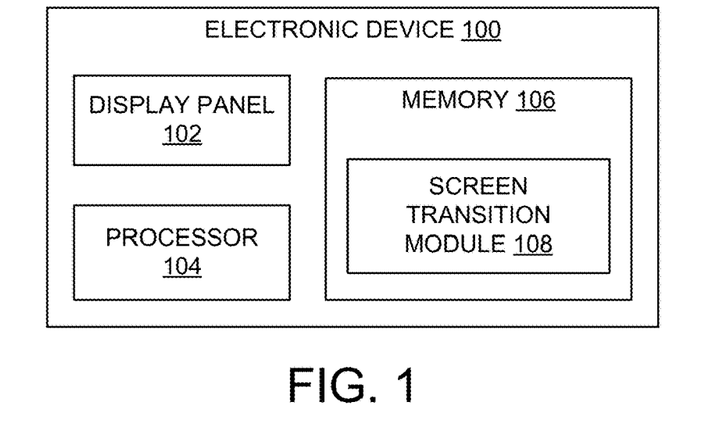
FIG. 1 is a block diagram of an example electronic device, including a processor to perform a screen transition to replace a menu option in a highlight indicator with a submenu option.

Turning now to the figures, FIG. 1 is a block diagram of an example electronic device 100, including a processor 104 to perform a screen transition to replace a menu option in a highlight indicator with a submenu option. Example electronic device 100 may include a wearable device (e.g., a smartwatch), a mobile phone, a printer, or the like. Electronic device 100 may include a display panel 102 (e.g., a liquid crystal display (LCD) panel). Display panel 102 may display a graphical user interface (GUI), whereby a user can select various menu options to set and/or manage functions of electronic device 100.

In an example, display panel 102 may display a first screen (e.g., a first GUI screen). The first screen may include the highlight indicator and a menu having a menu option displayed in the highlight indicator. An example menu option may be a user-selectable menu option. The highlight indicator may refer to a characteristic of a border visually indicating the menu option displayed therein. In an example, the highlight indicator may include a pill shape. In other examples, the highlight indicator may assume a form of a recognizable shape including, but not limited to, a line, a square, a rectangle, a circle, an ellipse, or the like. In yet other examples, the highlight indicator may be filled with a colour different from a background colour of the first screen.

Further, electronic device 100 may include a memory 106 and processor 104 connected to display panel 102 and memory 106. Processor 104 may be any type of central processing unit (CPU), microprocessor, or processing logic that interprets and executes machine-readable instructions stored in memory 106. Further, memory 106 may include screen transition module 108.

During operation, screen transition module 108 may receive a selection of the menu option that is displayed in the highlight indicator. Further, screen transition module 108 may perform a screen transition from the first screen to a second screen that displays the submenu option in the highlight indicator. The submenu option may be associated with the selected menu option. In an example of the smartwatch, the menu option may include contacts and the submenu option may include a name of a person in the contacts.

In an example, screen transition module 108 may perform the screen transition from the first screen to the second screen via a slidable replacement of the menu option in the highlight indicator with the submenu option. The highlight indicator may be static relative to the GUI during the screen transition. Further, the highlight indicator may contextually connect the submenu option of the second screen to the menu option of the first screen during the screen transition. The term "contextually connect" may refer to retaining at least a portion of the menu option in the highlight indicator when at least a portion of the submenu option enters the highlight indicator during the slidable replacement. In some examples, a size of the highlight indicator may be transformable based on a type of the submenu option, i.e., a length of the highlight indicator can contract or expand along an x-axis depending on a type of the submenu option. An example transformation of the size of the highlight indicator is explained with respect to FIGS. 8A, 8B, 9A, and 9B.

Further, screen transition module 108 may receive a user selection of a "back" option when the submenu option is displayed in the highlight indicator. For example, the back option, when selected, may replace a current screen that is displayed on the GUI with a screen that is previously displayed prior to the current screen. Upon receiving the selection of the "back" option, screen transition module 108 may perform the screen transition from the second screen to the first screen to slidably replace the submenu option in the highlight indicator with the menu option. The highlight indicator may be static and contextually connect the menu option of the first screen to the submenu option of the second screen during the screen transition from the second screen to the first screen. An example screen transition from the first screen to the second screen via the highlight indicator is explained with respect to FIGS. 2 and 6A.

In some examples, the functionalities described herein, in relation to instructions to implement functions of screen transition module 108 and any additional instructions described herein in relation to the storage medium, may be implemented as engines or modules including any combination of hardware and programming to implement the functionalities of the modules or engines described herein. The functions of screen transition module 108 may also be implemented by a processor. In examples described herein, processor may include, for example, one processor or multiple processors included in a single device or distributed across multiple devices.

Figure 2:
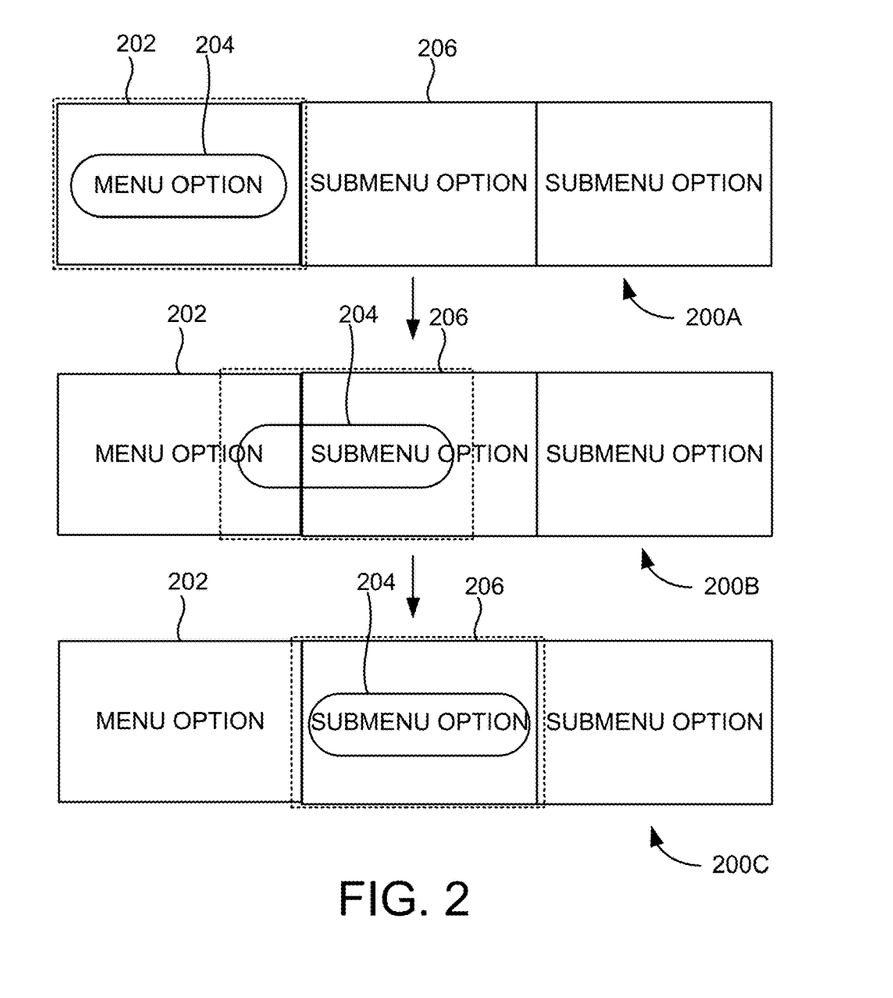
FIG. 2 is a schematic diagram depicting an example screen transition from a first screen to a second screen.

FIG. 2 is a schematic diagram depicting an example screen transition from a first screen 202 to a second screen 206. As shown in 200A, a GUI may initially display first screen 202 including a highlight indicator 204 and a menu option displayed therein. When the menu option displayed in highlight indicator 204 is selected, the screen transition from first screen 202 to second screen 206 may be performed to slidably replace the menu option in highlight indicator 204 with a submenu option. As shown in 200B, during the screen transition, highlight indicator 204 may contextually connect at least a portion of the submenu option of second screen 206 to at least a portion of the menu option of first screen 202. As shown in 200C, upon completion of the screen transition, the GUI may display second screen 206 including highlight indicator 204 and the submenu option displayed therein.

Thus, the highlight indicator described herein may provide both aesthetics and utility in continuity of a flow during the screen transitions, particularly, in significantly limited sized GUI screens. The highlight indicator may leverage visuospatial capability to connect the GUI screens with limited size and associated actions. Further, the design of the screen transitions can have adaptability and ability to be used across various types of data selection or entry screens. Furthermore, the screen transitions can be customizable to enhance visuospatial ability of the users.

Figure 3:
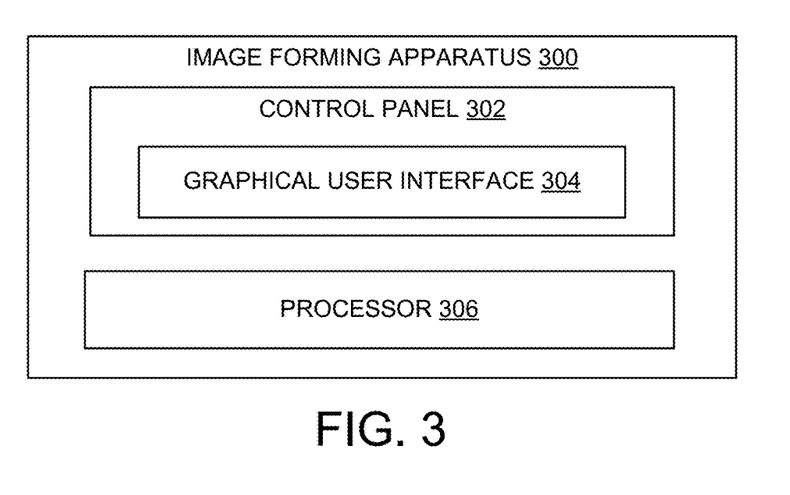
FIG. 3 is a block diagram of an example image forming apparatus, including a processor to perform a screen transition of a graphical user interface (GUI) to slidably replace a menu option in a highlight indicator with a submenu option.

FIG. 3 is a block diagram of an example image forming apparatus 300, including a processor 306 to perform a screen transition of a GUI 304 to slidably replace a menu option in a highlight indicator with a submenu option. For example, image forming apparatus 300 may be capable of performing functions such as printing documents, scanning documents, faxing documents, copying documents, and/or the like. Image forming apparatus 300 may be a single function peripheral (SFP) or a multi-function peripheral (MFP). For example, image forming apparatus 300 can be a laser beam printer (e.g., using an electrophotographic method for printing), an ink jet printer (e.g., using an ink jet method for printing), or the like.

Image forming apparatus 300 may include a control panel 302 to receive an input from a user to control image forming apparatus 300, for example, to perform a function (e.g., a copy function) of image forming apparatus 300. Example control panel 302 may include a keyboard, a button, a display panel, or combinations thereof for the user to operate image forming apparatus 300. The display panel may be a touchscreen to receive the input from the user.

As shown in FIG. 3, control panel 302 may display GUI 304. GUI 304 may display a highlight indicator and a first menu option in the highlight indicator. Further, image forming apparatus 300 may include processor 306. Processor 306 may be any type of central processing unit (CPU), microprocessor, or processing logic that interprets and executes machine-readable instructions stored in a memory of image forming apparatus 300.

During operation, processor 306 may receive, via control panel 302, a selection of a second menu option while the first menu option is in the highlight indicator. Further, processor 306 may modify GUI 304 to replace the first menu option in the highlight indicator with the second menu option. Upon modifying GUI 304, the second menu option is displayed in the highlight indicator. In an example, processor 306 may receive the selection of the second menu option via a push button on control panel 302, a touch button on control panel 302, or a touch screen panel of control panel 302.

Furthermore, processor 306 may receive, via control panel 302, a selection of the second menu option when the second menu option is in the highlight indicator. Then, processor 306 may perform a first screen transition of GUI 304 to slidably replace the second menu option in the highlight indicator with a submenu option such that the highlight indicator contextually connects the submenu option with the second menu option during the first screen transition. The highlight indicator may be static relative to GUI 304 during the first screen transition, i.e., the highlight indicator may not move or fade out relative to GUI 304 during the first screen transition.

Further, processor 306 may receive a user selection of a "back" option or "return" option when the submenu option is displayed in the highlight indicator. In response to the user selection of the "back" option, processor 306 may perform a second screen transition of GUI 304 to slidably replace the submenu option in the highlight indicator with the second menu option such that the highlight indicator contextually connects the second menu option with the submenu option during the second screen transition. The highlight indicator is static relative to GUI 304 during the second screen transition. Thus, processor 306 may morph GUI 304 to slidably replace a parent menu option in the highlight indicator with a child menu option and, while navigating back, to slidably replace the child menu option in the highlight indicator with the parent menu option, thereby enhancing the context of parent-child interactions.

Furthermore, in response to a selection of the submenu option, processor 306 may move the highlight indicator to an edge (e.g., a top edge) of GUI 304 and display a keypad or a keyboard above or below the highlight indicator. Further, processor 306 may display a user input received via the keypad or the keyboard in the highlight indicator. For example, a keypad or keyboard may be used on image forming apparatus, for instance, to fax a document to a contact number, email the document to an email address, or the like. An example keypad transition pattern is explained with respect to FIGS. 11A and 11B.

Figure 4:
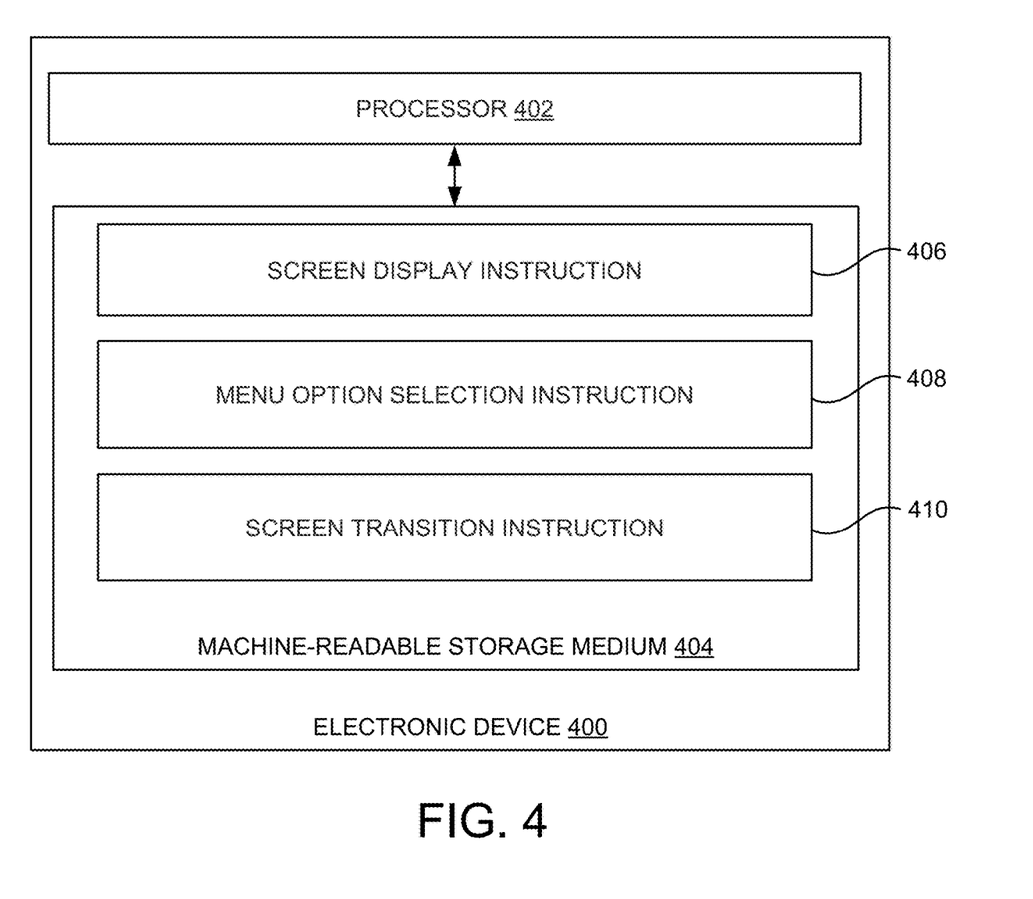
FIG. 4 is a block diagram of an example electronic device including a non-transitory machine-readable storage medium, storing instructions to perform a screen transition from a first screen to a second screen via a highlight indicator.

FIG. 4 is a block diagram of an example electronic device 400 including a non-transitory machine-readable storage medium 404, storing instructions to perform a screen transition from a first screen to a second screen via a highlight indicator. Electronic device 400 may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404.

Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 404 may be a non-transitory machine-readable medium, where the term "non-transitory" does not encompass transitory propagating signals. In an example, machine-readable storage medium 404 may be remote but accessible to electronic device 400.

Machine-readable storage medium 404 may store instructions 406-410. In an example, instructions 406 may be executed by processor 402 to display a first screen on a display panel of electronic device 400. The first screen may include a highlight indicator and a menu option displayed in the highlight indicator. Instructions 408 may be executed by processor 402 to receive a selection of the menu option. In response to receiving the selection, instructions 410 may be executed by processor 402 to perform a screen transition from the first screen to a second screen to:
  transform the highlight indicator into a first highlight indicator and a second highlight indicator, and
  display a submenu option in the first highlight indicator and an option to seek confirmation of a user selection of the submenu option in the second highlight indicator. The submenu option may be associated with the selected menu option. An example screen transition to transform the highlight indicator is described in FIG. 5.

In an example, transforming the highlight indicator may include contracting a length of the highlight indicator to form the first highlight indicator so that the display panel can accommodate a second highlight indicator adjacent to the first highlight indicator. Further, the screen transition from the first screen to the second screen may occur in a first direction. In an example, the menu option in the highlight indicator may be slidably replaced with the submenu option from a right side to a left side. In another example, the menu option may fade out of the highlight indicator while the submenu option may fade-in into the transformed first highlight indicator.

Machine-readable storage medium 404 may further store instructions to:
  receive a user selection of a "back" option when the submenu option is displayed in the first highlight indicator, and
  in response to receiving the user selection of the "back" option, perform the screen transition from the second screen to the first screen to:
    transform the first highlight indicator and the second highlight indicator into the highlight indicator, and
    display the menu option in the highlight indicator.

In an example, transforming the first highlight indicator and the second highlight indicator into the highlight indicator may include expanding a length of the first highlight indicator to form the highlight indicator. In this example, the second highlight indicator may be removed. Further, the screen transition from the second screen to the first screen may occur in a second direction that is opposite to the first direction. In this example, the submenu option in the first highlight indicator may be slidably replaced with the menu option from a left side to a right side. In another example, the submenu option may fade out of the first highlight indicator while the menu option may slide fade-in into the transformed highlight indicator.

In an example, the submenu option may be a slider control option that enables a user to drag a slider in the first highlight indicator to control a function associated with the submenu option. An example slider control option is explained in FIGS. 8A and 8B. In another example, the submenu option may be a tumbler control option that enables to change a parameter displayed in the first highlight indicator via rolling up or rolling down the parameter based on a user input. An example tumbler control option is explained in FIGS. 9A, 9B, 10A, and 10B.

Figure 5:
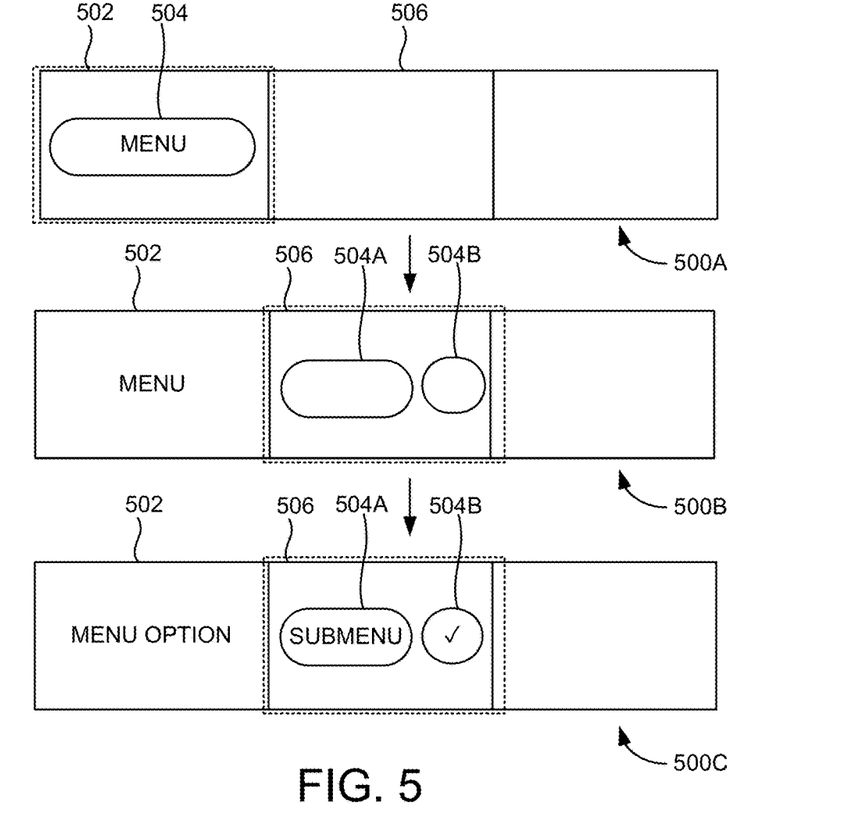
FIG. 5 is a schematic diagram depicting an example screen transition to transform a highlight indicator into a first highlight indicator and a second highlight indicator.

FIG. 5 is a schematic diagram depicting an example screen transition to transform a highlight indicator 504 into a first highlight indicator 504A and a second highlight indicator 504B. As shown in 500A, a GUI may initially display a first screen 502 including highlight indicator 504 with a menu option displayed therein. When the menu option displayed in highlight indicator 504 is selected, the screen transition from first screen 502 to a second screen 506 may be performed. During the screen transition, as shown in 500B, highlight indicator 504 may be transformed into first highlight indicator 504A and second highlight indicator 504B. In this example, first highlight indicator 504A may include a length less than that of highlight indicator 504. As shown in 500C, upon completion of the screen transition, the GUI may display second screen 506 including a submenu option in first highlight indicator 504A and an option to seek confirmation of a user selection of the submenu option in second highlight indicator 504B. In this example, the menu option may fade out of highlight indicator 504 of first screen 502 while the submenu option may fade-in into first highlight indicator 504A of second screen 506.

Figure 6A:
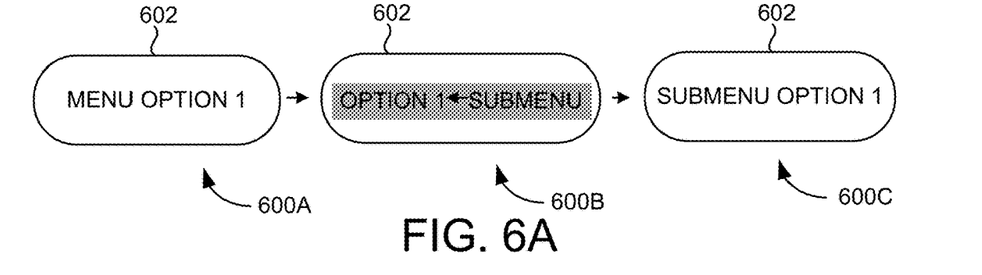
FIG. 6A is a schematic diagram depicting an example screen transition to slidably replace a menu option in a highlight indicator with a submenu option.

FIG. 6A is a schematic diagram depicting an example screen transition to slidably replace a menu option in a highlight indicator 602 with a submenu option. As shown in 600A, a GUI may initially display highlight indicator 602 and a menu option (i.e., menu option 1) displayed therein. When the menu option 1 displayed in highlight indicator 602 is selected, the screen transition may be performed to slidably replace the menu option 1 in highlight indicator 602 with the submenu option (i.e., submenu option 1). As shown in 600B, during the screen transition, highlight indicator 602 may contextually connect a portion of the submenu option 1 to a portion of the menu option 1. In this example, the menu option 1 in highlight indicator 602 may be slidably replaced with the submenu option 1 from a right side to a left side. As shown in 600C, upon completion of the screen transition, the GUI may display highlight indicator 602 with the submenu option 1 displayed therein.

Figure 6B:
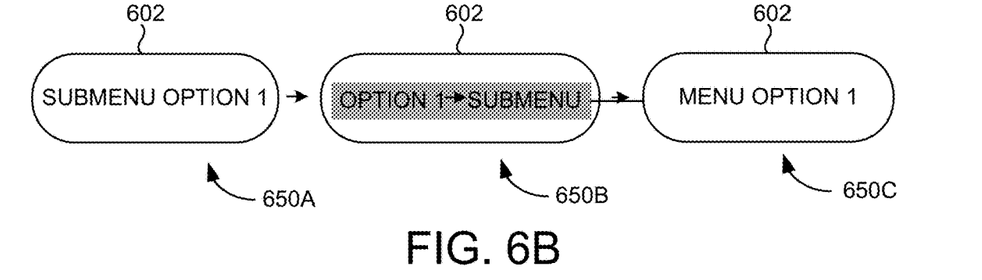
FIG. 6B is a schematic diagram depicting an example screen transition to slidably replace the submenu option in the highlight indicator of FIG. 6A with the menu option.

FIG. 6B is a schematic diagram depicting an example screen transition to slidably replace the submenu option in highlight indicator 602 of FIG. 6A with the menu option. As shown in 650A, the GUI may initially display highlight indicator 602 and the submenu option 1 displayed in highlight indicator 602. When a "return" or "back" option is selected while the submenu option 1 is displayed in highlight indicator 602, the screen transition may be performed to slidably replace the submenu option 1 in highlight indicator 602 with the menu option 1. As shown in 650B, during the screen transition, the highlight indicator 602 may contextually connect the submenu option 1 to the menu option 1. In this example, the submenu option 1 in highlight indicator 602 may be slidably replaced with the menu option 1 from the left side to the right side. As shown in 650C, upon completion of the screen transition, the GUI may display highlight indicator 602 with the menu option 1 displayed therein.

Figure 7A:
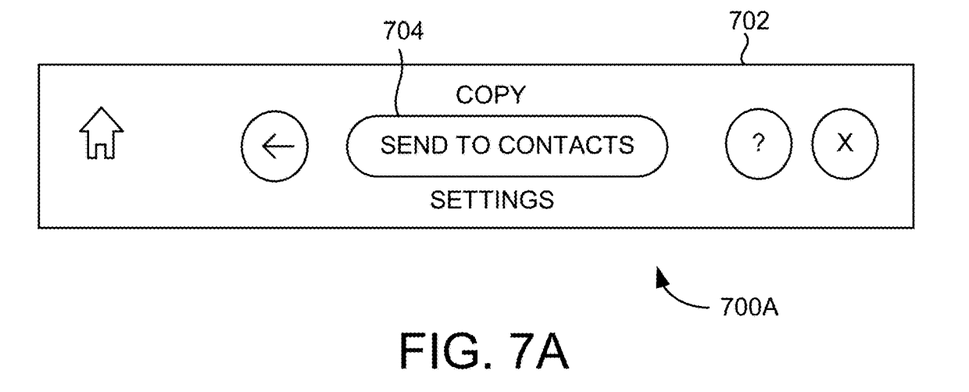
FIG. 7A is an example GUI, depicting a first screen including a menu option displayed in a highlight indicator.
Figure 7B:
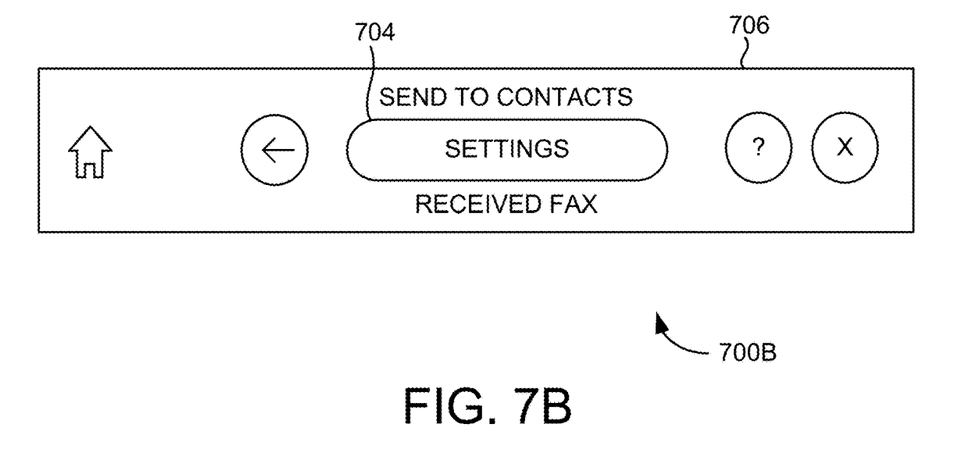
FIG. 7B is an example modified GUI, depicting a second screen including another menu option displayed in the highlight indicator of FIG. 7A.

FIG. 7A is an example GUI 700A, depicting a first screen 702 including an example menu option (i.e., send to contacts) displayed in a highlight indicator 704. For example, GUI 700A may be associated with a control panel of an image forming apparatus. As shown in FIG. 7A, GUI 700A may initially display first screen 702 including menu options such as a "copy" option (e.g., to perform a copy function), a "send to contacts" option (e.g., to send a document to a contact via FAX, email, or the like), and "settings" option (e.g., printer settings). In the example shown in FIG. 7A, GUI 700A may display highlight indicator 704 with "send to contacts" option displayed therein. When another option "settings" displayed in GUI 700A is selected, GUI 700A may be modified to replace the "send to contacts" option in highlight indicator 704 with the "settings" option. In this example, the "settings" option may move up or down to replace the "send to contacts" option in highlight indicator 704. As shown in FIG. 7B, a modified GUI 700B may display second screen 706 including highlight indicator 704 with the "settings" option displayed therein.

Figure 7C:
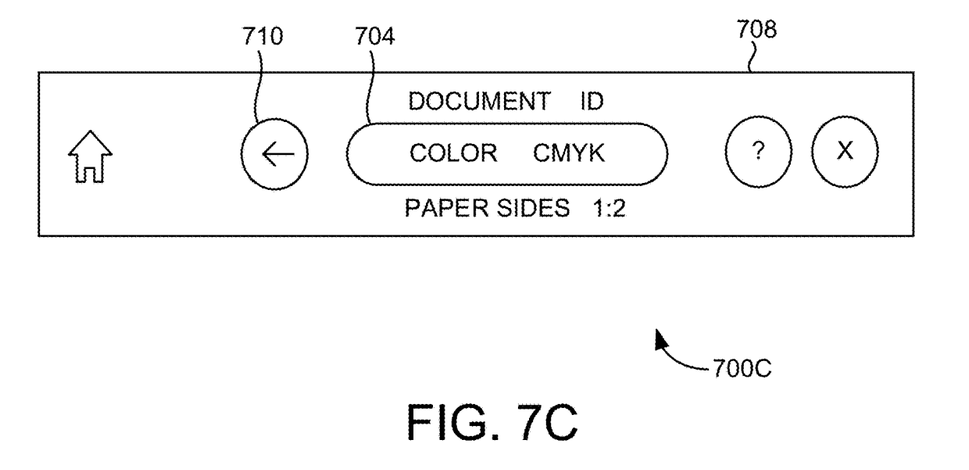
FIG. 7C is another example modified GUI, depicting a third screen including a submenu option in the highlight indicator of FIG. 7B.

When the "settings" option displayed in highlight indicator 704 is selected, the screen transition may be performed to slidably replace the "settings" option in highlight indicator 704 with a submenu option "color CMYK". As shown in a GUI 700C of FIG. 7C, upon completion of the screen transition, modified GUI 700C may display a third screen 708 including highlight indicator 704 with the "color CMYK" option displayed therein. In another example, when a "back" or "return" option 710 is selected, then the screen transition may be performed to slidably replace the "color CMYK" option in highlight indicator 704 with "settings" option (e.g., as shown in second screen 706 of FIG. 7B).

Figure 8A:
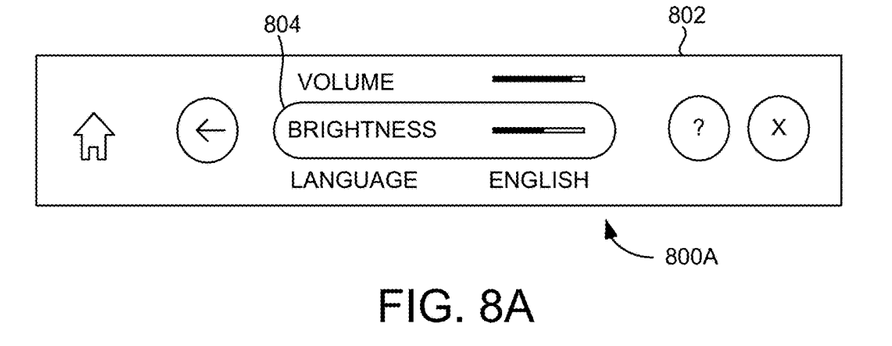
FIGS. 8A and 8B are schematic diagrams depicting an example screen transition to contract a length of a highlight indicator.
Figure 8B:
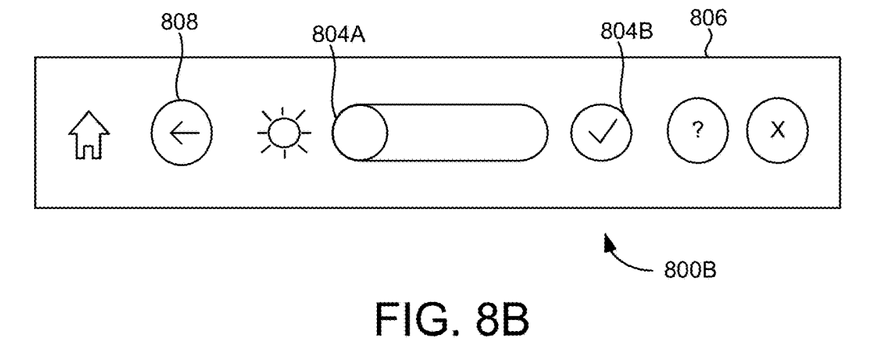

FIGS. 8A and 8B are schematic diagrams depicting an example screen transition to contract a length of a highlight indicator 804. As shown in 800A of FIG. 8A, a GUI may initially display a first screen 802 including highlight indicator 804 and a menu option "brightness" displayed therein. When the menu option "brightness" displayed in highlight indicator 804 is selected, the screen transition from first screen 802 to a second screen 806 may be performed. As shown in 800B of FIG. 8B, upon completion of the screen transition, the GUI may display second screen 806 including a submenu option (e.g., a slider control option) in a first highlight indicator 804A and an option to seek confirmation of the user selection of the slider option in a second highlight indicator 804B. In an example, the length of highlight indicator 804 may be contracted to form first highlight indicator 804A. During the screen transition, the menu option "brightness" may fade out of highlight indicator 804 of first screen 802 while the submenu option (e.g., a slider control option) may fade-in into first highlight indicator 804A of second screen 806.

In an example, the slider control option may enable a user to drag a slider within first highlight indicator 804A to adjust the brightness, for instance, of a display panel. In another example, when a "back" or "return" option 808 is selected, then the screen transition may be performed to extend the length of first highlight indicator 804A to form highlight indicator 804 and to replace the "slider option" option in first highlight indicator 804A with "brightness" option (e.g., as shown in first screen 802 of FIG. 8A).

Figure 9A:
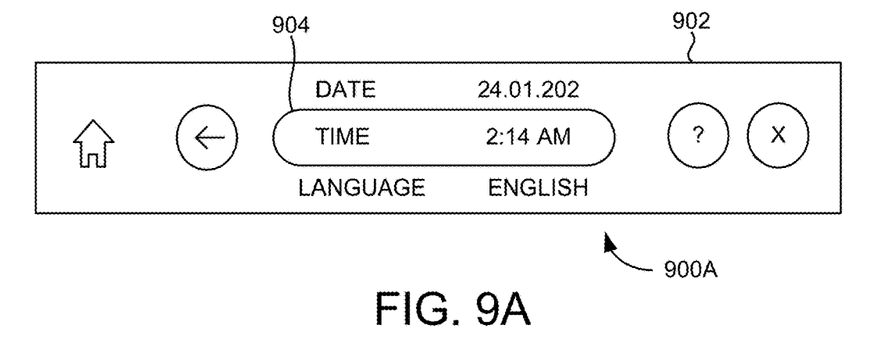
FIGS. 9A and 9B are schematic diagrams depicting an example screen transition to replace a menu option in a highlight indicator with a submenu option.
Figure 9B:
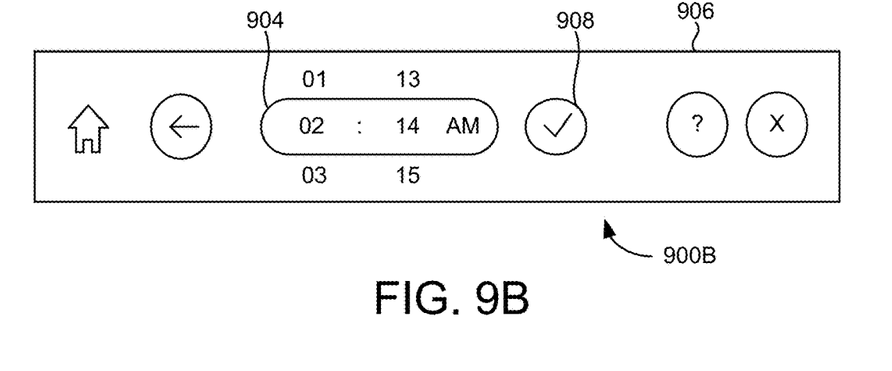

FIGS. 9A and 9B are schematic diagrams depicting an example screen transition to replace a menu option in a highlight indicator 904 with a submenu option. As shown in 900A of FIG. 9A, a GUI may initially display a first screen 902 including highlight indicator 904 and the menu option (e.g., time) displayed therein. When the menu option "time" displayed in highlight indicator 904 is selected, the screen transition may be performed from first screen 902 to a second screen 906 as shown in FIG. 9B. In the example shown in 900B, upon completion of the screen transition, the GUI may display second screen 906 including a submenu option (e.g., a tumbler control option to set the time) in highlight indicator 904 and an option 908 to seek confirmation of the user selection of the tumbler control option. In an example, highlight indicator 904 in FIG. 9B may include a reduced length compared to that of highlight indicator 904 in FIG. 9A, to accommodate option 908.

The tumbler control option may enable to change a parameter (e.g., time) displayed in highlight indicator 904 via rolling up or rolling down the parameter relative to highlight indicator 904 based on a user input. In an example, the user may set the time via the tumbler control option and confirm the time setting via option 908. In another example, the confirmation of the time setting can also be provided using a physical button disposed on a control panel.

Figure 10A:
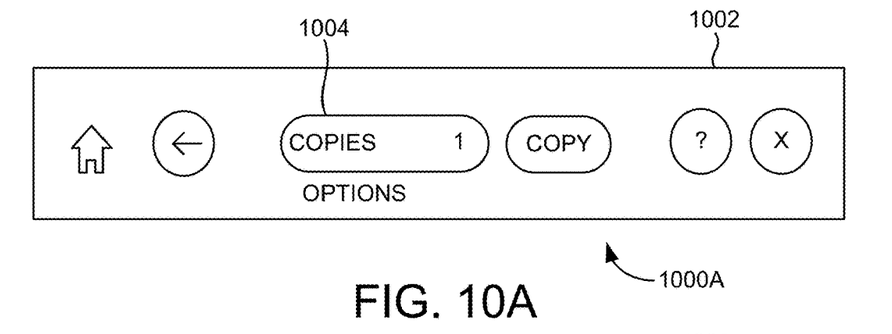
FIGS. 10A and 10B are schematic diagrams depicting another example screen transition to replace a menu option in a highlight indicator with a submenu option.
Figure 10B:
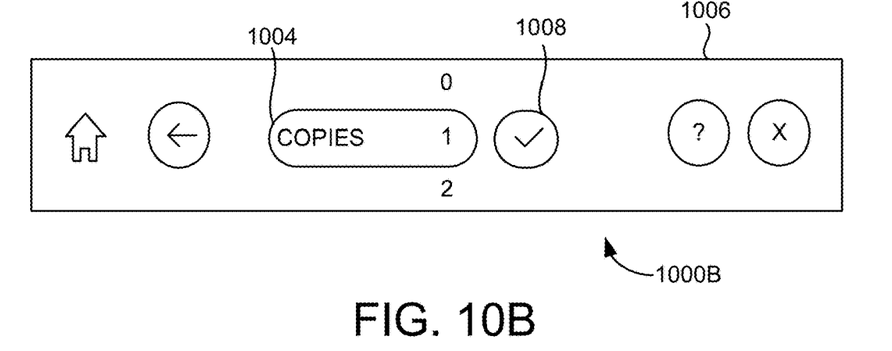

FIGS. 10A and 10B are schematic diagrams depicting an example screen transition to replace a menu option in a highlight indicator 1004 with a submenu option. As shown in 1000A, a GUI may initially display a first screen 1002 including a highlight indicator 1004 and a menu option (e.g., "copies" option to select a number of copies to be printed) displayed in highlight indicator 1004. When the menu option displayed in highlight indicator 1004 is selected, a screen transition may be performed from first screen 1002 to a second screen 1006 by replacing the "copies" option in highlight indicator 1004 with the submenu option to modify the number of copies to be printed. As shown in 1000B of FIG. 10B, upon completion of the screen transition, the GUI may display second screen 1006 including a submenu option (e.g., a tumbler control option to modify the number of copies to be printed) in highlight indicator 1004 and an option 1008 to seek confirmation of the user selection of the tumbler control option. The tumbler control option may enable to change a parameter (e.g., the number of copies) displayed in highlight indicator 1004 via rolling up or rolling down the parameter relative to highlight indicator 1004 based on a user input. In an example, the modified parameter may be confirmed using option 1008.

Figure 11A:
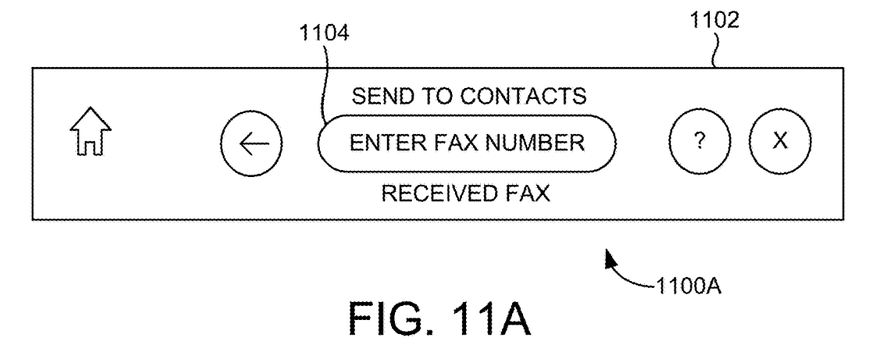
FIGS. 11A and 11B are schematic diagrams depicting an example screen transition to move a highlight indicator to an edge of a GUI.
Figure 11B:
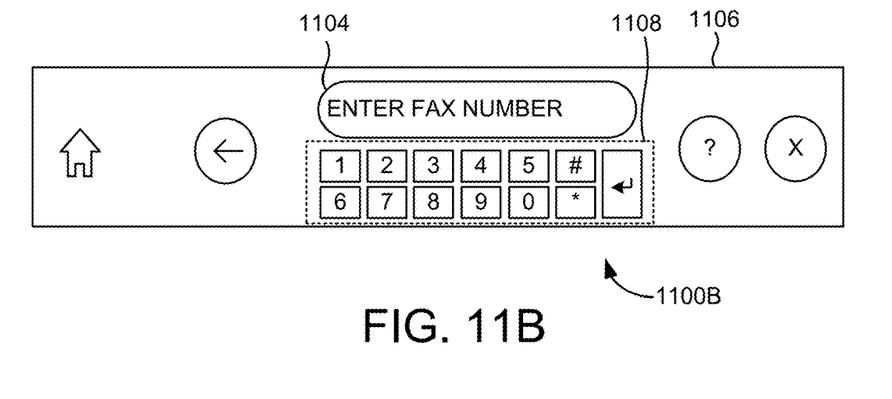

FIGS. 11A and 11B are schematic diagrams depicting an example screen transition to move a highlight indicator 1104 to an edge of a GUI. As shown in 1100A, the GUI may initially display a first screen 1102 including a highlight indicator 1104 and a menu option (e.g., "enter fax number" associated with a fax function) displayed in highlight indicator 1104. When "enter fax number" option displayed in highlight indicator 1104 is selected, a screen transition may be performed from first screen 1102 to a second screen 1106. As shown in 1100B of FIG. 11B, upon completion of the screen transition, the GUI may display second screen 1106 including highlight indicator 1104 moved to a top edge of the GUI and a submenu option (e.g., an area to display the fax number) in highlight indicator 1104. In this example, the highlight indicator 1104 may be moved to the top edge of the GUI to accommodate a keypad 1108 to enter the fax number, for instance. Further, second screen 1106 may display keypad 1108 below highlight indicator 1104. In an example, a user input (i.e., the fax number) received via the keypad may be displayed in highlight indicator 1104.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A non-transitory computer readable storage medium comprising instructions that when executed by a processor of an electronic device cause the processor to:
   display a first screen on a display panel of the electronic device, the first screen is to include a highlight indicator and a menu option displayed in the highlight indicator;
   receive a selection of the menu option; and
   in response to receiving the selection, perform a screen transition from the first screen to a second screen to:
      remove the highlight indicator of the first screen from the display panel;
      place a first highlight indicator and a second highlight indicator of the second screen on the display panel, the first highlight indicator being a contracted version of the highlight indicator to accommodate an addition of the second highlight indicator to the display panel; and
      display a submenu option in the first highlight indicator and an option to seek confirmation of a user selection of the submenu option in the second highlight indicator, wherein the submenu option is associated with the selected menu option.

2. The non-transitory computer readable storage medium of claim 1, further comprising instructions to:
   receive a user selection of a "back" option when the submenu option is displayed in the first highlight indicator; and
   in response to receiving the user selection of the "back" option, perform the screen transition from the second screen to the first screen to:
      remove the first highlight indicator and the second highlight indicator from the display panel;
      place the highlight indicator on the display panel; and
      display the menu option in the highlight indicator.

3. The non-transitory computer readable storage medium of claim 1, wherein, during the screen transition, the menu option is to fade out of the highlight indicator while the submenu option is to fade-in into the first highlight indicator.

4. The non-transitory computer readable storage medium of claim 1, wherein the submenu option is a slider control option that enables a user to drag a slider in the first highlight indicator to control a function associated with the submenu option.

5. The non-transitory computer readable storage medium of claim 1, wherein the submenu option is a tumbler control option that enables to change a parameter displayed in the first highlight indicator via rolling up or rolling down the parameter based on a user input.

6. The non-transitory computer readable storage medium of claim 1, wherein the second highlight indicator is adjacent to the first highlight indicator.

7. The non-transitory computer readable storage medium of claim 2, wherein, during the screen transition, the submenu option is to fade out of the first highlight indicator while the menu option is to fade-in into the highlight indicator.

8. An image forming apparatus comprising:
a control panel to display a graphical user interface (GUI), wherein the GUI is to display a first screen on a display panel of the image forming apparatus, the first screen is to include a highlight indicator and a menu option displayed in the highlight indicator; and
a processor to:
receive, via the control panel, a selection of the menu option; and
in response to receiving the selection, modify the GUI to perform a first screen transition from the first screen to a second screen to:
remove the highlight indicator of the first screen from the display panel; and
display a first highlight indicator and a second highlight indicator of the second screen on the display panel, the first highlight indicator being a contracted version of the highlight indicator to accommodate an addition of the second highlight indicator to the display panel.

9. The image forming apparatus of claim 8, wherein in response to receiving the selection, performing the first screen transition from the first screen to the second screen includes:
displaying a submenu option in the first highlight indicator and an option to seek confirmation of a user selection of the submenu option in the second highlight indicator, wherein the submenu option is associated with the selected menu option.

10. The image forming apparatus of claim 8, wherein the processor is to:

receive a user selection of a "back" option when a submenu option is displayed in the first highlight indicator; and
in response to the user selection of the "back" option, perform a second screen transition of the GUI from the second screen to the first screen to:
remove the first highlight indicator and the second highlight indicator from the display panel;
place the highlight indicator on the display panel; and
display the menu option in the highlight indicator.

11. The image forming apparatus of claim 8, wherein the highlight indicator of the first screen comprises a pill shape.

12. The image forming apparatus of claim 8, wherein the first highlight indicator of the second screen comprises a pill shape.

13. The image forming apparatus of claim 8, wherein the processor is to receive the selection of the menu option via a push button on the control panel, a touch button on the control panel, or a touch screen panel of the control panel.

14. The image forming apparatus of claim 9, wherein the processor is to:
perform the first screen transition from the first screen to the second screen via a slidable replacement of the menu option in the highlight indicator with the submenu option in the first highlight indicator.

15. The image forming apparatus of claim 10, wherein the processor is to:
perform the second screen transition from the second screen to the first screen via a slidable replacement of the submenu option in the first highlight indicator with the menu option in the highlight indicator.

16. The non-transitory computer readable storage medium of claim 1, wherein the first highlight indicator and the second highlight indicator of the second screen are placed on the display panel at a position different than the highlight indicator of the first screen.

17. The non-transitory computer readable storage medium of claim 1, wherein the first highlight indicator is the contracted version of the highlight indicator in a length direction along an x-axis of the display screen.

18. The non-transitory computer readable storage medium of claim 1, wherein a first parameter of the submenu option is static and a second parameter of the submenu option is a tumbler control option that enables change to the second parameter displayed in the first highlight indicator via rolling up or rolling down the second parameter based on a user input.

* * * * *